Patented Aug. 20, 1940

2,211,964

UNITED STATES PATENT OFFICE 2,211,964

ARTIFICIAL CELLULOSIC MATERIAL BONDED TO RUBBER AND METHOD OF PRODUCING THE BOND

Arthur P. Tanberg, Wilmington, Del., assignor, by mesne assignments, to E. I. du Pont de Nemours & Company, Wilmington, Del., a corporation of Delaware No Drawing. Application April 11, 1936, Serial No. 73,929

12 Claims. (Cl. 154—40)

This invention relates to the treatment of cellulosic materials to improve the adhesion thereto to natural rubber, compounded rubber, rubber substitutes and the like. More particularly, it relates to methods for obtaining improved adhesion between rubber and cellulosic threads, filaments, cords, fabrics and the like, and the products resulting from such methods. This invention is especially applicable to artificial threads as will be explained more in detail below.

In the past it has been found that artificial threads such as regenerated cellulose threads, filaments, cords and the like, adhere very poorly to compounded rubber stock when the two are united and the rubber stock is subsequently cured according to any of the known processes which produce commercially satisfactory adhesion between rubber and cotton. This poor adhesion of artificial threads to rubber has constituted a very serious obstacle to their use in place of cotton in the manufacture of automobile tires, reinforced rubber belts, and similar products consisting of alternate plies of rubber and cord which are required to adhere very strongly for long periods of time, under drastic conditions of high temperature, constant flexing and bending, shock, etc. Artificial threads would frequently be preferable to cotton in such use because of their continuous filament structure. If rayon cord, for example, is pressed into a commercial rubber stock such as is customarily used in the manufacture of tires and belting, and the whole is cured at high pressure and at an elevated temperature sufficient to completely vulcanize the rubber stock, it will be observed that the rayon cord can be pulled away from the rubber with comparative facility. Indeed, if subjected to a standard pull-out test which measures the force required to separate the cord from the rubber, rayon cord is found to adhere to rubber only approximately half as well as a similar cotton cord submitted to the same test.

It has now been discovered that certain compounds, when applied to rayon cord, will very greatly improve its adhesion to rubber. It has also been found that the adhesion of rayon cord to rubber is still further improved if the said compound is combined with a dispersion of rubber or latex or a solution of rubber, and applied to the cord. This invention enables the production of a rayon-reinforced rubber structure that is at least equal to and usually better, insofar as adhesion of the cord to the rubber is concerned, than similar rubber structures reinforced with untreated cotton.

It is an object of this invention to provide a method of securing improved adhesion between cellulosic material and rubber.

It is another object of this invention to provide a method for securing improved adhesion between rayon or other filamentous forms of regenerated cellulose and rubber.

A still further object of this invention relates to the production of artificial threads and plied structures made therefrom such as cords, comprising regenerated cellulose threads having a dry tenacity at room temperature (75° F.) in excess of two grams per denier characterized in that the rayon may be more firmly anchored to the rubber reinforced with said threads and/or plied structures.

Other objects of the invention will appear hereinafter.

The objects of the invention are accomplished in general by applying to cellulosic structures such as cellulosic threads and the like, a treating composition comprising an aqueous solution of de-acetylated chitin either alone or in combination with dispersed rubber or rubber latex, and drying the structure so treated whereby to greatly improve the adhesion between the cellulosic thread and rubber after their combination and vulcanization of the rubber, the adhesion being at least as good as the adhesion between untreated cotton and rubber after vulcanization, and from two to three times as good as that between untreated rayon threads and rubber after vulcanization.

In order to set forth more clearly and concisely the principles of the invention, it will be described with particular reference to rayon made by the viscose process and having a high dry tensile strength at room temperature (75° F.) of 2.0 grams or more per denier, and preferably of 2.5 grams or more per denier in the form of heavy cord. It is to be understood, however, that although the preferred form of artificial thread, employed by this invention, is strong rayon produced by the viscose process, the invention contemplates the treatment of any continuous filament cellulosic thread or filament structure produced by a wet process, that is to say, by coagulation from an aqueous cellulosic solution into an aqueous coagulating bath, for example, regenerated cellulose rayon made according to the cuprammonium or viscose process, cellulose esters such as lowly esterified cellulose acetate, of lowly etherified cellulose ethers such as lowly etherified glycol cellulose, lowly etherified methyl cellulose, lowly etherified ethyl cellulose, celuose glycollic acid or the like.

The invention includes cords and fabrics of any type of construction made from cellulosic threads or filaments. Obviously, where a cellulose derivative, such as cellulose acetate, which is thermoplastic in nature, is used, the temperature to which the material is subjected in various steps of the process must be kept well below the softening point of the cellulose derivative. Furthermore, the materials with which the derivative is treated, must be so chosen that the steps of the process can be carried out at a temperature below the softening point of the cellulose derivative.

The preferred cellulosic material used in this invention is in the form of strong viscose rayon threads having a dry tensile strength at room temperature (75° F.) of above 2.0 grams per denier, prepared in a manner taught by H. H. Parker in his copending patent application Serial No. 676,463, filed June 19, 1933, or in the form of twisted structures, such as strands or cords plied to said strong rayon thread.

As the rubber to which said cellulosic thread structures will adhere the invention contemplates any compounded natural rubber stock or any compounded synthetic rubber stock such as polymerized isoprene, or polymerized butadiene, or polymerized halogen substituted butadiene such as halogen-2-butadiene-1,3 polymer, e. g. chloro-2-butadiene-1,3 polymer, and other types.

Moreover, the rubber may contain any desired vulcanizers, stabilizers, accelerators, etc., singly or in any desired combination. In its preferred and common form the invention contemplates any commercial compounded rubber stock such as is commonly employed in the fabrication of automobile tires, hose, raincoat material, shoes, belting such as conveyor belts, fan belts, or other driving belts, or the like.

The term "rubber" unless otherwise modified, as used in the specification and claims, is intended to be used in its generic sense to include rubber substitutes, natural rubber, compounded rubber, synthetic rubber, and the like.

As a means for improving the adhesion of the cellulosic thread structure to rubber, this invention contemplates de-acetylated chitin, either alone or in combination with dispersed rubber or rubber latex.

Chitin is an acetylated carbohydrate amine polymer, and may be, for convenience, termed "chitose amine polymer," a material which is present in the shells of crustacea, such as shrimp, crab and lobster, and of certain insects, and after the removal of the acetate, as by saponification, a product, which is believed to be a carbohydrate amine polymer, is capable of reacting with acid to form salt. The de-acetylated chitin referred to in the examples given below, may be prepared as described in U. S. Letters Patent to Rigby, No. 2,040,879, issued May 19, 1936, one method of preparation being described as follows:

Shrimp, lobster or crab shells are treated first with a 1% solution of soda ash at boiling temperature for about six hours, after which the liquor is drained off and the shells washed with water until free of alkali as tested by phenolphthalein. The washed shells are then subjected for a period of time to treatment with a 5% hydrochloric acid solution until all lime salts have been removed (10 to 12 hours at ordinary temperatures). After washing with water to remove the acid, the shells are given a second treatment with a 1% soda ash solution containing about 0.02% ordinary soap, the treatment being carried out at the boiling temperature of the solution for a period of about 8 hours. After this treatment the shells are drained free of the liquor and water-washed until free of alkali as tested by phenolphthalein, whereupon they are centrifuged to remove as much water as possible. The shells are then treated with 40% sodium hyroxide at 110 degrees centigrade for about four hours, after which they are again water-washed until free of alkali as tested by phenolphthalein. The residue is de-acetylated chitin, is pure white, and, after drying at 65 degrees centigrade, may be used to prepare solutions in acids as desired.

The chitin may be partially or completely de-acetylated depending on the conditions present during the de-acetylation. The more complete the de-acetylation, the more soluble is the salt produced by reacting with acid. Thus, chitose amine polymer, from which the acetyl substituent has been completely removed, forms the most soluble salt. However, during de-acetylation, some degradation of this chitose amine polymer takes place and the extent of degradation increases as the de-acetylation becomes more complete. Thus, for purposes of expediency, there must be a balance established between the completeness of de-acetylation and the degradation of the de-acetylated product. For ordinary purposes, it will be sufficient to use a product prepared from chitin which has been 85 to 90 per cent de-acetylated. It will be understood that this range of de-acetylation is not limitative since chitin, which has been de-acetylated to an extent as low as 50 per cent or lower or as high as 100 per cent, may be used with advantage.

It has been stated that chitin is believed to be an acetylated carbohydrate amine polymer. This is in accordance with the evidence presented in the literature. It is also believed to be an acetylated mixed or cross or inter-polymer of two carbohydrate amines. We do not wish, however, to be limited to theory, but cover the use of the de-acetylated chitin regardless of its ultimate molecular composition.

The carbohydrate amine polymer itself, termed herein a "de-acetylated chitin," is very insoluble in water, and in organic solvents, but it may be made soluble by causing it to react with any one of a large number of acids including acetic, formic, citric, glycolic, malic, maleic, succinic, adipic, phthalic, tartaric, benzoic and hydrochloric acids, and the like. Coatings or films prepared from aqueous solutions of these water-soluble salts, upon being dried, preferably at an elevated temperature, are more or less rapidly rendered insoluble both in water and in organic solvents. In the case of salts formed by reacting with volatile acids, particularly volatile acids which are only slightly ionized, like acetic acid, the conversion to insolubility is easily and quickly accomplished since the acid, being weak or slightly ionized is readily dissociated from its salt and being volatile is easily removed by heat, leaving an insoluble residue. Salts formed from the non-volatile acids and/or from the highly ionized acids are much less readily converted to insolubility, and consequently in the practice of this invention, it is preferred to use salts of the de-acetylated chitin and of volatile acids of low ionization, of which acetic acid is an example. However, in the case of the salts formed from the non-volatile and/or highly ionized acids, these salts may be converted into the insoluble form by treatment with ammonia, as, for example, in the form of gaseous ammonia.

As the means for improving the adhesion of the cellulosic thread structure to rubber, this invention contemplates de-acetylated chitin either alone or in combination with dispersed rubber or rubber latex on the cellulosic structure.

As the means for obtaining a cellulosic thread structure having thereon de-acetylated chitin either alone or in combination with rubber, an aqueous solution or dispersion is used containing either the de-acetylated chitin alone or in combination with dispersed rubber or rubber latex, passing the cellulosic thread structure in the form of individual cords or a fabric through the solution and drying the so-treated cord or fabric at a temperature of 250° F. or less such as cord is generally subjected to during the drying and vulcanizing or curing operations in the manufacture of tires, fan belts and the like.

De-acetylated chitin is not water-soluble but will, as stated above, dissolve in aqueous solutions of a variety of acids. Various concentrations of de-acetylated chitin may be used in the operation of this invention but the preferred concentration lies between 1 and 4% by weight of de-acetylated chitin in dilute acid solutions containing 0.3 to 1.2% by weight of acid. The acids particularly suitable for dissolving the de-acetylated chitin are preferably organic acids and more particularly those organic acids which possess a low boiling point so that during the drying operation of the cord or fabric previously treated by passage through the aqueous solution containing de-acetylated chitin and the acid, the acid will be substantially completely evaporated and removed from the cord or fabric in order to eliminate any possible deleterious effect any residual acid on the cord or fabric might have upon the cellulosic structure. Among the organic acids possessing these qualifications and therefore particularly suitable for use in dissolving de-acetylated chitin may be mentioned formic and acetic acid. If desirable, however, other higher boiling organic acids may be used in which case it is preferable to increase the time or temperature or both of drying the cord after passage through the aqueous solution of de-acetylated chitin in order to insure substantially complete removal of acid from the cord. It is, however, easily possible and usually preferable according to this invention to select for use for dissolving de-acetylated chitin such organic acids which are substantially completely removed from the treated cord or fabric when dried according to the methods in use in current commercial processes for the treatment of cords or fabrics for use in automobile tires, fan belts, and the like.

While treatment of rayon with such an aqueous acid solution of de-acetylated chitin as has been described with subsequent drying to substantially completely remove the acid from the cellulosic structure improves the adhesion of rayon to rubber, this invention also contemplates the employment of an aqueous acid solution of de-acetylated chitin in combination with dispersed rubber or rubber latex. This may be accomplished in a number of ways, the simplest and most convenient of which contemplates the combination of an aqueous acid solution of de-acetylated chitin with an aqueous acidic dispersion of rubber or rubber latex before application to the rayon. The latex or rubber may be present in the solution for treating the rayon in any desired proportion although the improvement in adhesion is most marked when concentrations of rubber or latex solids are used which are between 2% and 25% by weight and preferably between 5% and 15% by weight. If a natural latex dispersion is used it may be either crude acidified latex or latex which contains added materials or which has been treated to alter the character of the rubber in it, for instance by degradation or oxidation or both. For instance it may contain any desired and suitable accelerators, vulcanizers, stabilizers, dispersing agents or any other substances such as are commonly used in the rubber industry. When rubber is used as an artificial acidic dispersion in water of either natural rubber or any known synthetic rubber it may likewise contain additionally such substances as rubber accelerators, vulcanizers, stabilizers, dispersing agents and the like. The type or kind of rubber dispersion or rubber latex to be used depends to some extent upon the type or kind of rubber stock to which it is desired to bond the treated rayon. For example to obtain good adhesion between the treated rayon and synthetic rubber composed of chloro-2-butadiene-1,3 polymer it is preferable to treat the rayon with the aqueous dispersion of the de-acetylated chitin in combination with chloro-2-butadiene-1,3 polymer latex. The thread-treating composition may also contain other materials such as casein, glutinous materials, water-soluble adhesives, wetting agents, and the like, which may be added as adhesives, stabilizers, or for a variety of purposes without departing from the fundamental principle of this invention.

The preparation of an acidic rubber dispersion or rubber latex, suitable for use in the operation of this invention, from a dispersion of rubber or alkaline rubber latex may be accomplished by any of the known methods for preparing such a rubber dispersion or latex, such as for example, by stabilizing the rubber dispersion or rubber latex with a small amount of ammonium caseinate, removing the ammonia from the latex by addition of the required amount of formaldehyde and then adding with stirring to the stabilized latex sufficient acid to bring the pH of the latex below 6. Preferably although not necessarily the same acid is used to acidify the rubber dispersion or rubber latex as is used in dissolving the de-acetylated chitin which is to be used in combination with the acidic rubber dispersion or rubber latex. The choice of a suitable acid for acidifying the dispersion of rubber or rubber latex is governed by the same considerations discussed in connection with suitable acids for use in dissolving the de-acetylated chitin.

The simplest and most convenient method for preparing an aqueous acidic solution of de-acetylated chitin together with dispersed rubber or rubber latex is to combine with stirring an aqueous acidic solution of de-acetylated chitin with an aqueous acidic dispersion of rubber or rubber latex.

Instead of applying dispersed rubber or rubber latex to the cord together with the de-acetylated chitin in a single step from an aqueous solution which contains both the de-acetylated chitin and the dispersed rubber or rubber latex this invention also contemplates as a method for improving the adhesion of rayon to rubber the steps of treating the rayon with an aqueous acidic solution of the de-acetylated chitin subsequently drying the cord at a temperature sufficient to insure substantially complete removal of the acid and then treating the resulting de-acetylated chitin coated rayon with a solution of rubber in toluene or other suitable rubber solvent, drying the so treated cord to evaporate the solvent so that the cord has a coating of the de-acetylated chitin and on that a coating of rubber. The rubber solution used may be a solution of either natural or synthetic rubber and may be either raw rubber or rubber compounded with any of the usual accelerators, vulcanizers, stabilizers and the like which are commonly added to rubber or of degraded, oxidized or otherwise modified rubber.

Other variations in the method of applying to rayon cord de-acetylated chitin and rubber or rubber latex to improve the adhesion of the cord to rubber are also possible according to this invention. For instance the cord may be treated first with an aqueous acidic solution of de-acetylated chitin and dried at a temperature to substantially completely remove the acid and then with an aqueous acidic solution of de-acetylated chitin to which an acidified dispersion of rubber or rubber latex has also been added. Or the rayon cord may be given two treatments, the first with an aqueous acidic mixture containing de-acetylated chitin and dispersed rubber or rubber latex and then with the same aqueous acidic mixture containing the de-acetylated chitin and dispersed rubber or rubber latex or with a different aqueous acidic mixture containing de-acetylated chitin and dispersed rubber or rubber latex and containing a different ratio of de-acetylated chitin to rubber solids. It is understood that after each aqueous treatment the cord is dried before the application of the next successive treatment.

The application of a composition containing de-acetylated chitin alone or together with a dispersion of rubber or rubber latex from an aqueous solution to rayon cord or fabric may be accomplished in a number of ways. For example the rayon cord or fabric may be passed through the composition contained in a tank then between two doctor knives or squeeze rolls to remove the excess composition from the cord or fabric and thence over a series of dryer rolls maintained at a temperature sufficiently high to dry out the cord or fabric and to insure substantially complete removal of the acid. Other equally suitable means for applying the composition containing the de-acetylated chitin and rubber to rayon cord or fabric may be employed such as by means of transfer rolls, spraying, brushing, etc. Likewise drying of the treated rayon cord or fabric may be accomplished in other ways such as for example by means of a belt or frame carrying the treated rayon cord or fabric through a heated closed chamber, etc.

If rayon tire cord treated with an aqueous dispersion containing de-acetylated chitin and dispersed rubber or rubber latex and dried at an elevated temperature in the manner described by this invention is placed upon a commercial compounded rubber stock such as is customarily used in the manufacture of tires and the whole is cured at high pressure and elevated temperature sufficient to vulcanize the rubber stock completely, the treated rayon cord is found to adhere strongly to the rubber. Indeed if the cord is subjected to a standard pull-out test which measures the force required to separate the cord from the rubber and therefore constitutes a measure of the adhesion between the cord and rubber, it is found that the adhesion between the treated rayon and rubber is at least equal to and often greater than that obtained between cotton and rubber and may be two or even more times better than the adhesion between untreated rayon and rubber. If the treated rayon cord is subjected to a standard pull-out test at an elevated temperature, for example at 270° F., to measure the adhesion between the cord and rubber at this temperature the adhesion is found to be equal to and often better than the adhesion of cotton cord to rubber at this temperature, a fact which is of utmost importance in the construction of tires, fan belts and similar articles which develop a high temperature under ordinary conditions of usage. This constitutes a great advantage in the above described treatment over a number of other adhesion treatments which when applied to rayon result in a treated cord with good adhesion to rubber at room temperature but with poor adhesion to rubber at an elevated tempreature.

In addition to improving the adhesion of rayon to rubber by treating the rayon with an aqueous solution of de-acetylated chitin together with dispersed rubber or rubber latex as hereinbefore described this treatmen greatly increases the length of time a pad consisting of plies of so treated cords or fabric to which a skim coat of compounded rubber stock has been applied and the whole subjected to sufficient pressure and temperature to completely vulcanize the rubber may be flexed and bent under tension before separation of the plies takes place. For example whereas such a pad prepared from untreated rayon may be flexed 2000 times before separation of the plies takes place a similar pad prepared from rayon treated according to the teaching of this invention may be flexed 12,000 times before separation of the plies takes place, a fact which is of utmost importance in the construction of tires.

Furthermore, rayon cord treated according to this invention in order to improve its adhesion to rubber undergoes no marked decrease in fatigue resistance. Fatigue resistance of a tire cord is measured in a variety of ways in one of which the cord is subjected for a fixed number of flexings to drastic conditions of flexing and simultaneous stretching at an elevated temperature which conditions approximate those encountered during the actual use of tires. The tensile strength of the cord after the prescribed flexing and stretching compared with the tensile strength before the test gives a measure of the fatigue resistance of the cord. For rayon cord treated according to this invention the drop in tensile strength after the fatigue resistance test is very slight whereas cotton cord loses its tensile strength entirely when subjected to the same test. This improved resistance to fatigue at elevated temperatures exhibited by rayon cord treated according to this invention is a great advantage in cord designed for use in tires, fan belts and the like which develop a high temperature under ordinary conditions of usage and at the same time undergo constant and severe flexing, bending and stretching.

In addition to the foregoing advantages in the use of an aqueous solution of de-acetylated chitin either alone or in combination with a dispersion of rubber or rubber latex for improving the adhesion of rayon to rubber is the fact that this treatment does not alter the color of the rayon cord or fabric which is treated. Another advantage is the ease with which the treatment may be applied to rayon cord or fabric which makes unnecessary any changes in equipment in current commercial processes in use for the treatment of fabrics or individual cords.

It is to be understood that, although the application of de-acetylated chitin either alone or in combination with dispersed rubber or rubber latex has been largely described herein as a means of improving the adhesion of rayon tire cord or fabric to rubber, this method is by no means limited to these specific cellulosic structures. De-acetylated chitin either alone or in combination with dispersed rubber or rubber latex is equally useful for adhering rubber to a great variety of cellulosic structures such as for example regenerated cellulose or cellulose precipitated from an aqueous disperson in the form of films, tubing, straw, ribbons, sponges and the like; also for adhering rubber to staple rayon, bristles, artificial horsehair and the like.

In order more clearly to illustrate this invention the following examples are given. It is of course to be understood that the invention is not limited to these precise examples which are merely illustrative of the invention. Obviously various other modifications will occur to those skilled in the art which, however, do not depart from the spirit and nature of this invention.

*Example I*

An aqueous solution is prepared containing 2% by weight of de-acetylated chitin and 0.6% by weight of acetic acid. Cord from viscose process rayon and of construction suitable for use in automobile tires is passed through this solution slowly enough to be thoroughly wet and is then dried at a temperature of 85° C. or higher by passage over heated rollers or by other suitable means and is then laid upon a thin sheet of compounded rubber stock and the whole subjected to sufficient temperature and pressure to completely vulcanize the rubber. After curing the rayon cord is found to adhere very firmly to the rubber so that a force is required to separate it which is at least twice as great as is required for bare untreated rayon and is approximately equal to or greater than that required in the case of untreated cotton cord used in the manufacture of tires.

*Example II*

An aqueous solution is prepared containing 1.2% by weight of de-acetylated chitin and 0.4% by weight of methacrylic acid. Rayon tire cord is passed through this solution, dried, applied to compounded rubber stock and the cord and rubber cured or vulcanized as described in Example I to give a product exhibiting good adhesion between the rayon cord and rubber.

*Example III*

An aqueous solution is prepared containing 2% by weight of de-acetylated chitin, 5% by weight of natural rubber latex solids, 3% by weight of formic acid and 0.25% by weight of ammonium caseinate. Rayon tire cord is passed through this solution, dried, applied to compounded rubber stock and the cord and rubber cured or vulcanized just as described in Example I to give a product exhibiting good adhesion between the rayon cord and rubber.

*Example IV*

An aqueous solution is prepared containing 2% by weight of de-acetylated chitin, 5% by weight of rubber latex solids containing suitable accelerators, vulcanizers, stabilizers, etc., 5% by weight of acetic acid, and 0.25% by weight of ammonium caseinate. Rayon tire cord is passed through this solution, dried, applied to compounded rubber stock and the cord and rubber cured or vulcanized just as described in Example I to give a product exhibiting good adhesion between the rayon cord and rubber.

A particularly good latex for use according to the methods described comprises a so-called creamed latex prepared by treating natural rubber latex with soap, ammonium alginate and the like, creaming by whipping or other vigorous agitation to a temperature of 70–90° C., skimming, and using the top portion that has been skimmed off. The creamed latex is then used in the same way as the various latices disclosed in the examples.

Instead of drying the cord at elevated temperatures as set forth in the preceding examples, the impregnated cord may be dried at room temperature or thereabouts, and subsequently vulcanized to the rubber at the customary temperature.

Parts and proportions are intended to be parts and proportions by weight unless otherwise indicated.

Since it is obvious that many changes and modifications of the invention can be made within the nature and spirit thereof, it is to be understood that the invention is not to be limited thereto except as set forth in the appended claims.

I claim:

1. In the process of manufacturing reinforced rubber articles such as rubber tires and the like, the steps which comprise treating threads, cords, fabrics, and the like, prepared from continuous artificial cellulosic filaments with an aqueous solution containing, as an essential bonding ingredient, deacetylated chitin, associating the article so treated with vulcanizable rubber, and then subjecting the mass to a vulcanizing temperature.

2. In the process of manufacturing reinforced rubber articles such as rubber tires and the like, the steps which comprise treating threads, cords, fabrics, and the like prepared from continuous regenerated cellulose filaments having a dry tenacity at room temperature of above two grams per denier with an aqueous acid solution containing, as an essential bonding ingredient, deacetylated chitin, insolubilizing the deacetylated chitin, associating the article so treated with vulcanizable rubber, and then subjecting the mass to a vulcanizing temperature.

3. In the process of manufacturing reinforced rubber articles such as rubber tires and the like, the steps which comprise treating threads, cords, fabrics, and the like prepared from continuous regenerated cellulose filaments having a dry tenacity at room temperature of above two grams per denier with an aqueous acid solution containing, as essential bonding ingredients, rubber latex and deacetylated chitin, insolubilizing the deacetylated chitin, associating the article so treated with vulcanizable rubber, and then subjecting the mass to a vulcanizing temperature.

4. In the process of manufacturing reinforced rubber articles such as rubber tires and the like, the steps which comprise treating threads, cords, fabrics, and the like prepared from continuous regenerated cellulose filaments having a dry tenacity at room temperature of above two grams per denier with an aqueous solution containing, as essential bonding ingredients, rubber latex together with an organic acid and deacetylated chitin, insolubilizing the deacetylated chitin, associating the article so treated with vulcanizable rubber, and then subjecting the mass to a vulcanizing temperature.

5. In the process of manufacturing reinforced rubber articles such as rubber tires and the like, the steps which comprise treating threads, cords, fabrics, and the like prepared from continuous regenerated cellulose filaments having a dry tenacity at room temperature of above two grams per denier and obtained from viscose, with an aqueous solution containing, as essential bonding ingredients, rubber latex together with a volatile organic acid and deacetylated chitin, heating the threads, cords, fabrics, and the like, so treated, at a temperature sufficiently elevated to volatilize the acid and insolubilize the deacetylated chitin, associating the article so treated with vulcanizable rubber, and then subjecting the mass to a vulcanizing temperature.

6. In the process of manufacturing reinforced rubber articles such as rubber tires and the like, the steps which comprise treating threads, cords, fabrics, and the like prepared from continuous artificial cellulosic filaments with an aqueous solution containing, as an essential bonding ingredient, deacetylated chitin, drying the threads, cords, fabrics, and the like so treated, plying the same with sheets of commercial compounded vulcanizable rubber, and then subjecting the mass to a vulcanizing temperature.

7. In the process of manufacturing reinforced rubber articles such as rubber tires and the like, the steps which comprise treating threads, cords, fabrics and the like prepared from continuous regenerated cellulose filaments having a dry tenacity at room temperature of above two grams per denier with an aqueous acid solution containing, as an essential bonding ingredient, deacetylated chitin, drying the threads, cords, fabrics, and the like so treated, plying the same with sheets of commercial compounded vulcanizable rubber, and then subjecting the mass to a vulcanizing temperature.

8. In the process of manufacturing reinforced rubber articles such as rubber tires and the like, the steps which comprise treating threads, cords, fabrics, and the like prepared from continuous regenerated cellulose filaments having a dry tenacity at room temperature of above two grams per denier with an aqueous solution containing, as essential bonding ingredients, rubber latex, together with an organic acid and deacetylated chitin, drying the threads, cords, fabrics, and the like so treated, plying the same with sheets of commercial compounded vulcanizable rubber, and then subjecting the mass to a vulcanizing temperature.

9. In a process of manufacturing reinforced rubber articles such as rubber tires and the like, the steps which comprise treating threads, cords, fabrics, and the like prepared from continuous regenerated cellulose filaments having a dry tenacity at room temperature of above two grams per denier and obtained from viscose, with an aqueous solution containing, as essential bonding ingredients, rubber latex, together with a volatile organic acid and deacetylated chitin, drying the threads, cords, fabrics, and the like so treated, plying the same with sheets of commercial compounded vulcanizable rubber, and then subjecting the mass to a vulcanizing temperature.

10. Vulcanized rubber articles, such as rubber tires and the like, reinforced with threads, cords, fabrics, and the like prepared from continuous artificial cellulosic filaments, said threads, cords, fabrics and the like being adhered to the vulcanized rubber in said articles by means of a composition comprising, as an essential bonding ingredient, deacetylated chitin.

11. Vulcanized rubber articles, such as rubber tires and the like, reinforced with threads, cords, fabrics, and the like prepared from continuous regenerated cellulose filaments having a dry tenacity at room temperature of above two grams per denier, said threads, cords, fabrics, and the like being adhered to the vulcanized rubber in said articles by means of a composition comprising, as an essential bonding ingredient, deacetylated chitin.

12. Vulcanized rubber articles, such as rubber tires and the like, reinforced with threads, cords, fabrics, and the like prepared from continuous regenerated cellulose filaments having a dry tenacity at room temperature of above two grams per denier obtained from viscose, said threads, cords, fabrics, and the like being adhered to the vulcanized rubber in said articles by means of a composition comprising, as essential bonding ingredients, deacetylated chitin and rubber.

ARTHUR P. TANBERG.